US011009583B1

(12) United States Patent
Michaelis et al.

(10) Patent No.: US 11,009,583 B1
(45) Date of Patent: May 18, 2021

(54) REFINING AND SELECTING TIMING DATA TO INCREASE ACCURACY OF TIMING-BASED LOCATION FOR USER EQUIPMENT

(71) Applicant: AT&T Intellectual Property I, L.P., Atlanta, GA (US)

(72) Inventors: Charles Michaelis, Johns Creek, GA (US); Mark D. Austin, Allen, TX (US); Sheldon Meredith, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/724,781

(22) Filed: Dec. 23, 2019

(51) Int. Cl.
*G01S 5/10* (2006.01)
*G06N 7/00* (2006.01)
*G06N 20/00* (2019.01)

(52) U.S. Cl.
CPC ............... *G01S 5/10* (2013.01); *G06N 7/005* (2013.01); *G06N 20/00* (2019.01)

(58) Field of Classification Search
CPC ..... H04W 64/00; H04W 4/02; H04W 56/006; H04W 64/003; G01S 5/10; G01S 5/06; G01S 5/0036; G06N 20/00; G06N 7/005
USPC ............. 455/456.1, 456.2, 456.3, 457, 404.2
See application file for complete search history.

(56) References Cited

U.S. PATENT DOCUMENTS

| 6,230,018 | B1 * | 5/2001 | Watters | ............... G01S 5/02 340/988 |
| 6,473,619 | B1 | 10/2002 | Kong et al. | |
| 6,671,649 | B2 | 12/2003 | Kuwahara | |
| 6,983,146 | B2 | 1/2006 | Spratt | |
| 7,139,583 | B2 | 11/2006 | Yamasaki | |
| 7,463,979 | B2 | 12/2008 | King | |
| 7,852,266 | B2 | 12/2010 | Kim et al. | |
| 8,095,148 | B2 | 1/2012 | Rekimoto | |
| 8,195,200 | B2 | 6/2012 | Mohi et al. | |
| 8,249,622 | B2 | 8/2012 | Alles et al. | |
| 8,280,398 | B2 | 10/2012 | Ishii et al. | |
| 8,326,317 | B2 | 12/2012 | Alles et al. | |

(Continued)

FOREIGN PATENT DOCUMENTS

WO 2019/061949 A1 4/2019

OTHER PUBLICATIONS

Altintas et al., "Improving RSS-Based Indoor Positioning Algorithm via K-means Clustering", Apr. 2011, 5 pages. (Year: 2011).*

(Continued)

*Primary Examiner* — Quoc Thai N Vu
(74) *Attorney, Agent, or Firm* — Amin, Turocy & Watson, LLP

(57) ABSTRACT

Machine learning on user equipment candidate locations provides more accurate location estimation in timing-based location estimation. For instance, timing signals from a user equipment are collected, and adjusted using calibration data, previously known for pairs of fixed-located cells. The adjusted timing data are processed into a location candidate dataset. The location candidate data set is iteratively processed using machine learning technology to eliminate candidate locations until an estimated location is determinable. The location estimation via the described technology is significantly more accurate than other timing-based methods.

20 Claims, 11 Drawing Sheets

(56) References Cited

U.S. PATENT DOCUMENTS

| | | | |
|---|---|---|---|
| 8,874,133 B2 | 10/2014 | Flanagan et al. | |
| 9,113,305 B2 | 8/2015 | Lim et al. | |
| 9,332,394 B2 | 5/2016 | Moshfeghi | |
| 9,448,072 B2 | 9/2016 | Bandyopadhyay et al. | |
| 9,763,048 B2 | 9/2017 | Curtis et al. | |
| 9,813,877 B1 | 11/2017 | Chrabieh | |
| 9,967,715 B2 | 5/2018 | Ahmed et al. | |
| 10,212,545 B2 | 2/2019 | Choi et al. | |
| 2012/0058782 A1* | 3/2012 | Li | H04W 4/029 455/456.2 |
| 2012/0142375 A1* | 6/2012 | Alles | G01S 5/06 455/456.1 |
| 2013/0166246 A1 | 6/2013 | Rousu et al. | |
| 2015/0031389 A1* | 1/2015 | Liu | H04W 64/006 455/456.1 |
| 2016/0309300 A1 | 10/2016 | Dong et al. | |
| 2018/0302740 A1 | 10/2018 | Tseng et al. | |
| 2019/0212977 A1* | 7/2019 | Sicurelli, III | G06F 7/08 |

OTHER PUBLICATIONS

Zhao, Yilin et al., "Standardization of Mobile Phone Positioning for 3G Systems", IEEE Communications Magazine, Jul. 2002, pp. 108-116.

Mensing et al., "Data-Aided Location Estimation in Cellular OFDM Communications Systems", Munich University of Technology, Apr. 21, 2016, 8 pages.

Rowe et al., "Enhanced GPS: The tight integration of received cellular timing signals and GNSS receivers for ubiquitous positioning", IEEE Cambridge Silicon Radio, 2008, pp. 838-845.

Hiltunen et al., "Performance Evaluation of LTE Radio Fingerprint Positioning with Timing Advancing", Department of Mathematical Information Technology, 2015, 5 pages.

Chawla et al., "k-means—: A unifed approach to clustering and outlier detection", Proceedings of the 2013 SIAM International Conference on Data Mining, 9 pages.

Howe et al., "Clustering and Anomaly Detection in Tropical Cyclones", 2013, 1 pages.

\* cited by examiner

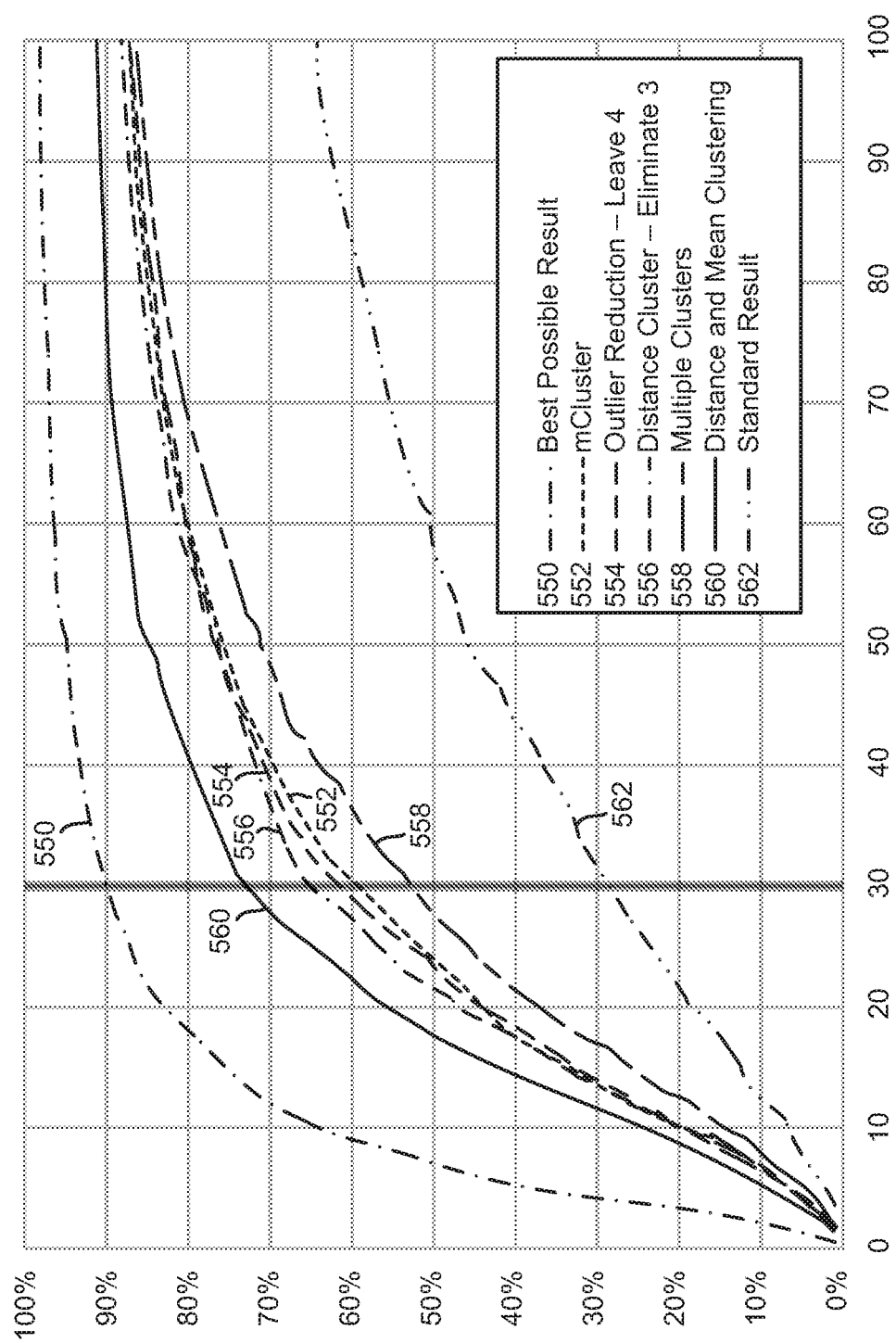

US 11,009,583 B1

REFINING AND SELECTING TIMING DATA TO INCREASE ACCURACY OF TIMING-BASED LOCATION FOR USER EQUIPMENT

TECHNICAL FIELD

The subject disclosure relates to wireless communications and, more particularly, to location determination of mobile devices in a wireless communications network. For instance, timing data can be refined and selected to increase accuracy of timing-based location for user equipment.

BACKGROUND

In wireless communications networks, some mobile devices (user equipments) are equipped with Global Positioning Systems (GPS) or other, generally software-based location determination mechanisms. However, many mobile devices do not have such location determination mechanisms. Other times, mobile devices do not have the power or capability for accurate GPS signal reception, such as when a clear view of satellites is not available, which can occur indoors, in "urban canyons" and in other such situations.

As a result, location determination of a mobile device often relies on timing-based location methods. When a mobile device (user equipment) is asked for a timing-based location result by a network device, the network device relies on the timing data that the user equipment returns and the base stations' (cellular radio) locations from which the user equipment receives timing signals. This process takes the timing data and normally returns a location (latitude, longitude and possibly an altitude) and an accuracy uncertainty. This uncertainty translates into an accuracy level that represents the radius of uncertainty of the locate.

One example of a timing based location method is (Observed Time Difference Of Arrival), which uses Relative Signal Time Differences (RSTDs) reported by mobile devices. A recent study showed that the standard accuracy from the OTDOA method had a median value averaging sixty meters. This accuracy is not sufficient for many commercial scenarios (e.g. advertising/geo-fencing) or internal (e.g., small cell placement) use scenarios.

BRIEF DESCRIPTION OF THE DRAWINGS

The technology described herein is illustrated by way of example and not limited in the accompanying figures in which like reference numerals indicate similar elements and in which:

FIG. 5 is a graphical representation showing relative results of locate estimation using various technologies (also relative to known data), in accordance with various aspects and implementations of the subject disclosure.

DETAILED DESCRIPTION

Figure 1:
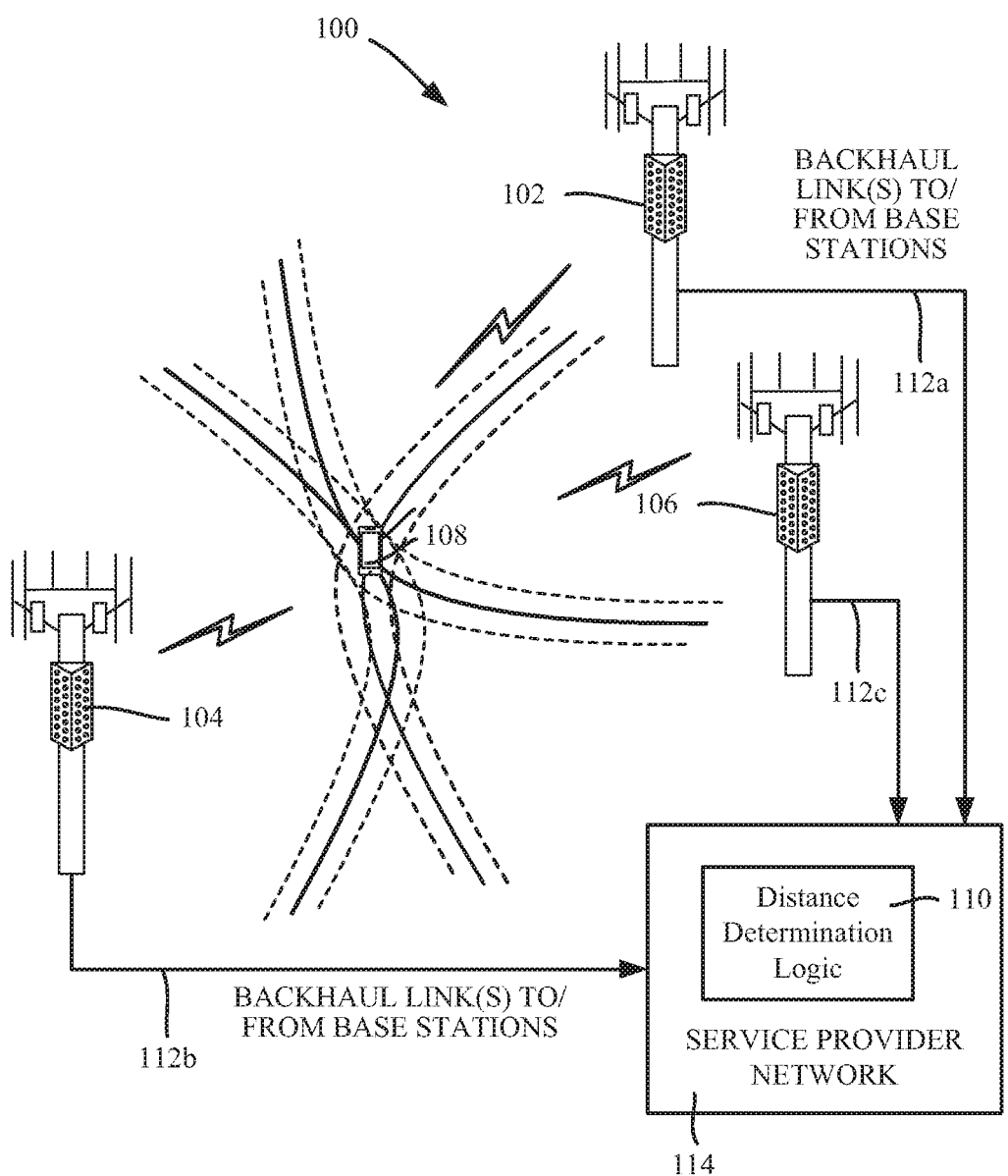
FIG. 1 illustrates an example wireless communication system in which a user equipment communicates with base stations, including to report timing data, in accordance with various aspects and implementations of the subject disclosure.

Various aspects of the technology described herein are generally directed towards more accurate timing-based location of a user equipment (mobile device) in a wireless network. Aspects are directed towards obtaining the timing data from a user equipment, typically corresponding to dozens or even hundreds of possible locations. Calibration data, previously obtained and known to the network (e.g., using GPS data for precise location determinations relative to fixed cell sites) are used to adjust the timing data/locates into adjusted data, comprising candidate locations. Thereafter, using one (or more) machine learning/clustering techniques, the candidate locations are iteratively narrowed down until an estimated location is obtained. As will be understood, the technology described herein provides for a significant increase in the level of accuracy in timing-based location determination relative to existing timing-based location technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

By way of further description with respect to one or more non-limiting ways to determine location information, FIG. 1 is an example representation of a wireless environment 100 that can operate in accordance with aspects described herein. In FIG. 1, example wireless environment 100 illustrates base stations 102, 104 and 106 (e.g., NodeBs) corresponding to cell sites. Although three such base stations 102, 104 and 106 are shown, it is understood that wireless cellular network deployments can have any practical number of such base stations. A user equipment (UE) 108 is also shown The wireless communication system 100 can employ various cellular systems, technologies, and modulation schemes to facilitate wireless radio communications between devices (e.g., a UE 108 and a network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier 1-DMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UE 108 and the network devices 102, 104 and 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Note that a DMRS structure for four antenna ports (hence maximum four layers and 4 DMRS) in NR system, for example, has reference symbols within a resource-block transmitted for a single antenna port 0; the same reference symbols are code multiplexed and transmitted on antenna port 1. Similarly for ports 2 and 3 same resource elements are used for transmitting DMRS (demodulation reference symbols), and are code multiplexed as in port 0 and 1. Further note that the resource elements used for rank 3 and rank 4 (ports 2 and 3) are orthogonal in frequency to that of port 0 and 1.

As shown in FIG. 1 via the curved (e.g., hyperbola) lines, the timing signals received by a user equipment 106 from the base stations such as 102, 104 and 106 can be used to estimate the location of a user equipment 108; note that the locations of the base stations 102, 104 and 106 are known and fixed in this scenario. However, as represented by the dashed curves, there is an area of uncertainty with each timing measurement and corresponding location.

Described herein is the use of distance determination logic 110 to adjust the measured data into more accurate, adjusted candidate locations based on previously determined calibration data, and further to eliminate candidate locations based on machine learning into a reduced number of candidate locations. To this end, the timing data is represented in FIG. 1 as being sent from the base stations 102, 104 and 106 via respective backhaul links 112a, 112b and 112c to a service network provider 114 that incorporates or is coupled to the distance determination logic 110. However, this is only one possible configuration, and, for example, any base station or other network device, such as an edge network device, can be configured to perform the distance determination as described herein. It is also feasible for a sufficiently powerful mobile device to be provided with calibration data and perform at least some of the computations.

Figure 2:
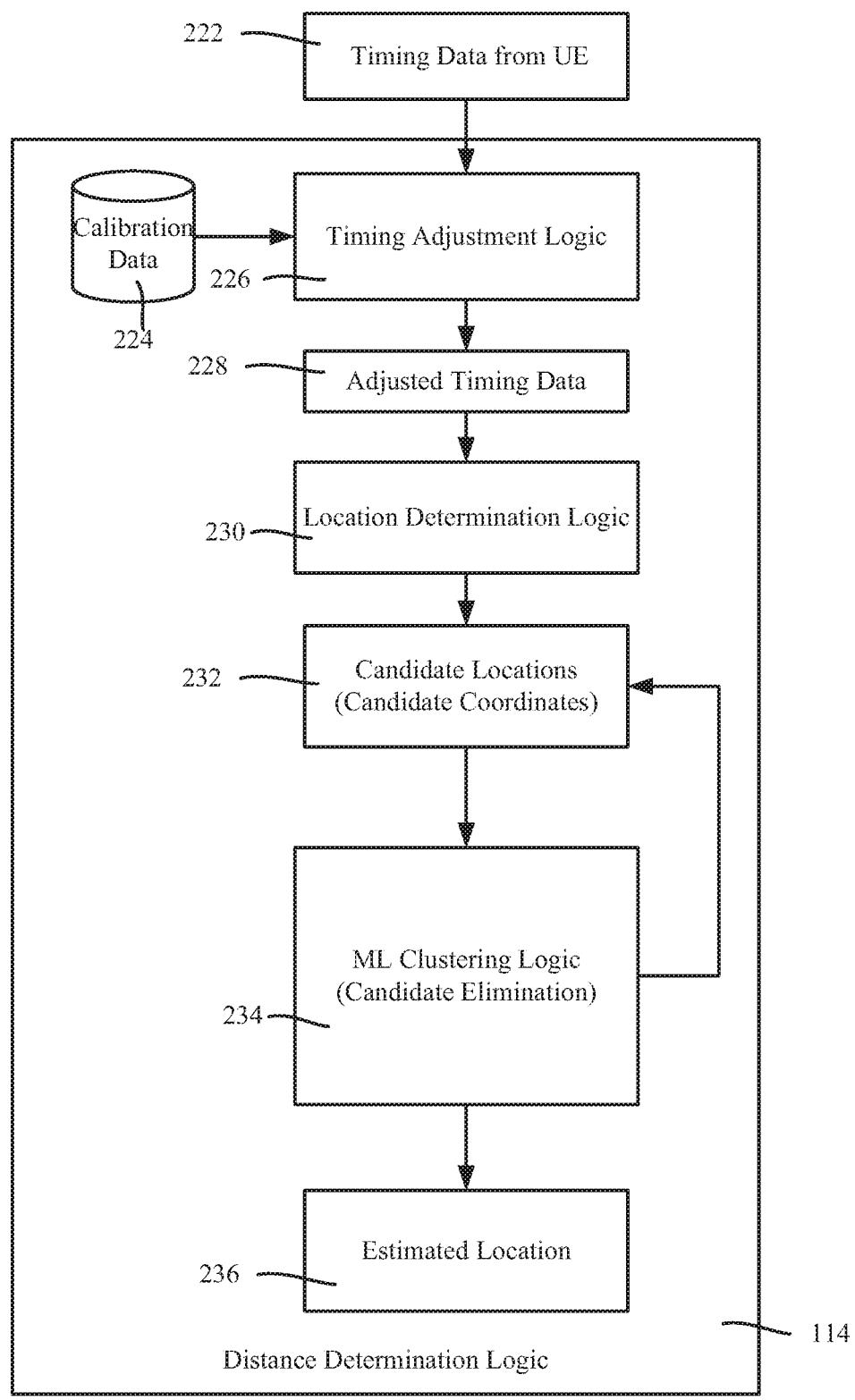
FIG. 2 illustrates an example of distance determination logic, based on using adjusted timing data and machine learning, in accordance with various aspects and implementations of the subject disclosure.

FIG. 2 shows general concepts related to distance determination as represented by the example distance determination logic 110 represented in FIG. 1. In general, a calibration operation has previously collected Relative Signal Time Differences (RSTDs) and adjusted these data into RSTD adjustments. These corrections or offsets (calibration data) are specific to particular cell pairs, and are calculated based on multiple samples with the same cellular pairs; note that the location of every cell (base station) is known and remains constant.

Once the calibration data are known for a pair of cells, they can be used to adjust for actual timing data of a user equipment within those cells' timing signal coverage. In FIG. 2, timing data 222 from a user equipment at a location-to-be-estimated are processed to correct for delay errors between cell pairs, such as described in U.S. Pat. No. 8,892,054; e.g., due to "propagation delay due to signal repeaters, physical structures, seasonal change in foliage and the like." As set forth above, calibration data 224 are obtained and stored for pairs of base stations with fixed positions, and when applied by timing adjustment logic 226 for pairs of cells, operates to correct the timing data 222 into adjusted timing data 228. The calibration data 224 can be maintained as delay error offsets in various embodiments, which can be updated as appropriate The adjusted timing data 228 is then processed by location determination logic 230 into hyperbolic candidate locations 232 for the estimated location of the mobile device. Note that the number of candidate locations 228 typically can range from dozens to hundreds of possible locations for a given user equipment.

As described herein, machine learning (ML) clustering logic 230 iteratively processes the candidate locations 228 in a way that eliminates unlikely candidate locations and thus narrows down the remaining possible candidate locations into a desired smaller number of (as few as one) candidate locations. Note that if more than one candidate location remains as the desired number (e.g., four) following clustering or the like, such remaining locations can be used in further computations (such as averaging) into a single estimated location 232.

Thus, for any pair of cells, a corresponding calibration dataset provides for improved timing-based locations for the various RSTD data reported from the UE, by adjusting the timing data based on the offsets in the calibration dataset for that cell pair. After the RSTDs are gathered and adjusted, hyperbolic location candidates are calculated. Once the candidates are determined, machine learning techniques are used to help determine which candidate locations have more importance than the others in the candidate location dataset, and cluster and eliminate candidates until a final location can be estimated.

Figure 3:
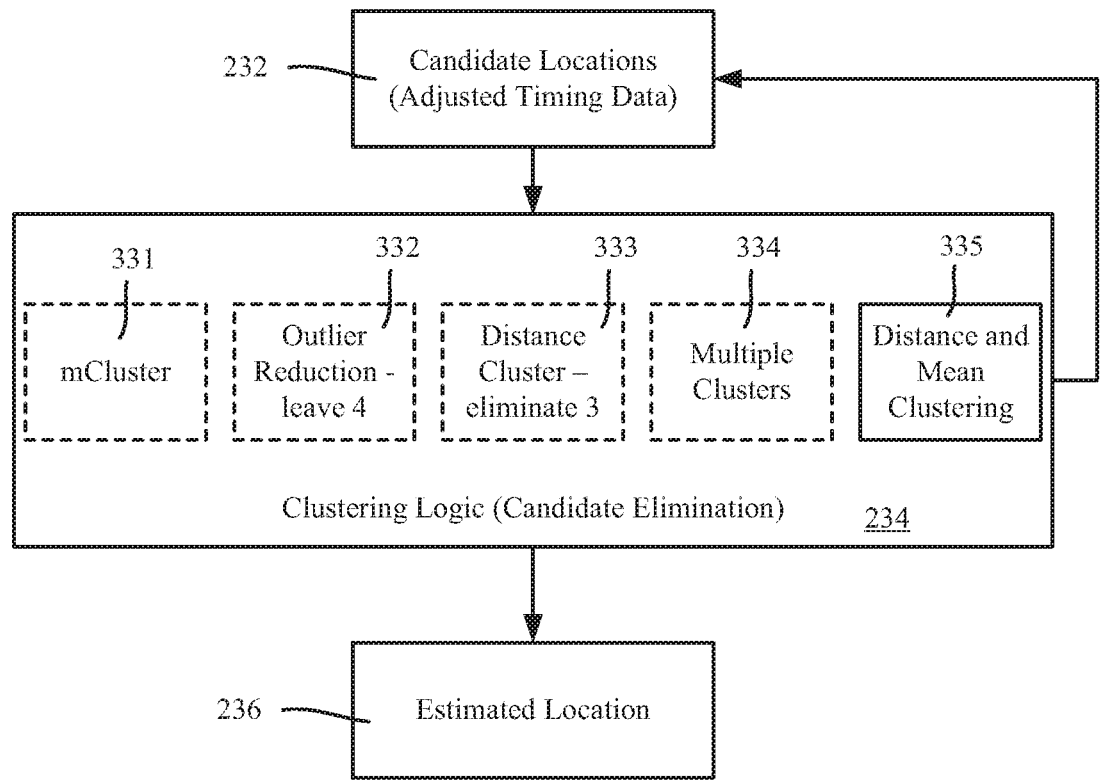
FIG. 3 is a block diagram representation of various machine learning technologies than can estimate location of a user equipment, in accordance with various aspects and implementations of the subject disclosure.

FIG. 3 shows various, non-limiting example technologies 331-335 that can be used by the machine learning (ML) clustering logic 234 to eliminate candidate locations 232 until a final estimated location 236 (or location set) is obtained. In one or more implementations only one such machine learning technology is employed, (whereby four of the machine learning technologies 331-334 are represented as dashed blocks), although it is feasible to combine techniques, such as to use a first machine learning technique to reduce the candidate location dataset to some lesser number, and then apply a second machine learning technique on the lesser number of candidate until a final location 236 can be estimated.

The machine learning logic 234 uses the different candidate locations, and eliminates and emphasizes particular data points, to obtain a best estimate of where the mobile device is located, e.g., latitude, longitude and optionally altitude. In testing, the test operation knew where the device was located, and therefore knew which candidate location was actually closest to the device. This location is labeled as the "Best Possible Result" as described below with reference to FIG. 5.

As represented in FIG. 3, one machine learning technology to cluster hyperbolic candidate locations is referred to as mCluster 331. In general, the mCluster 331 technology takes the candidate locations as input to an mclust library, a 2009 public R library, which in general uses a Gaussian mixture modeling process on a dataset using mathematical elimination and clustering to create a result e. More particularly, as described in the R documentation (where MCMC refers to Markov Chain Monte Carlo), the library "implements methods for processing a sample of (hard) clusterings, e.g. the MCMC output of a Bayesian clustering model. Among them are methods that find a single best clustering to represent the sample, which are based on the posterior similarity matrix or a relabelling algorithm."

Another machine learning technology to cluster hyperbolic candidate locations is shown in FIG. 3 as block 332, and is referred to as "Outlier Reduction—leave 4." In general, this technology determines the average location, eliminates the furthest (one or more locations) away, and iterates with the reduced set as many times as it takes until four remain. This technology thus uses a k-means process on the candidate location dataset with automated outlier detection, e.g., using the kmodR library, a 2015 public R library as described in https://CRAN.R-project.org/package=kmodR.

Another machine learning technology shown in FIG. 3 as block 333 is "Distance Cluster—eliminate 3," which uses a k-means process with a k value of 3.

Yet another machine learning technology shown in FIG. 3 as block 334 is referred to as "Multiple Clusters," which uses a k-means process with multiple cluster sizes. More particularly, after half the results furthest away from the clusters are eliminated, the k-means clustering process is run with a k value of 3.

Figure 4A:
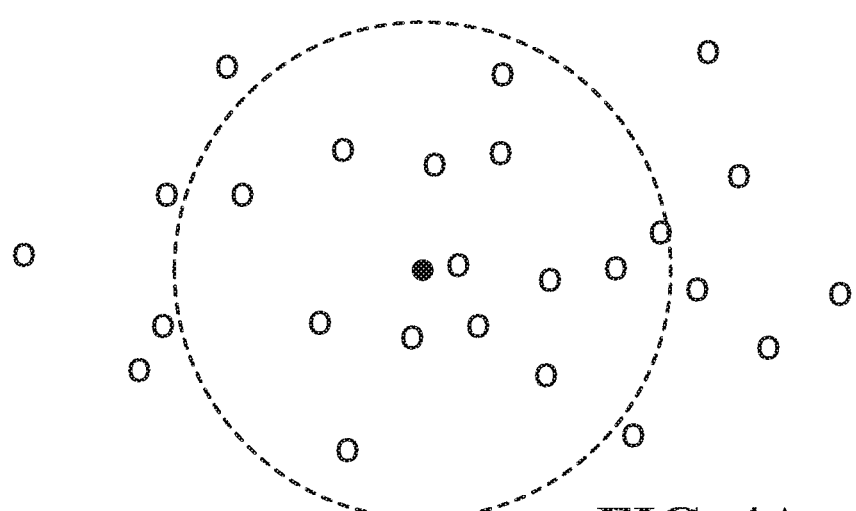
FIGS. 4A-4C are example representations illustrating how configurable radii and iteratively recomputed centroids can be used to estimate a user equipment location from candidate locations, in accordance with various aspects and implementations of the subject disclosure.
Figure 4B:
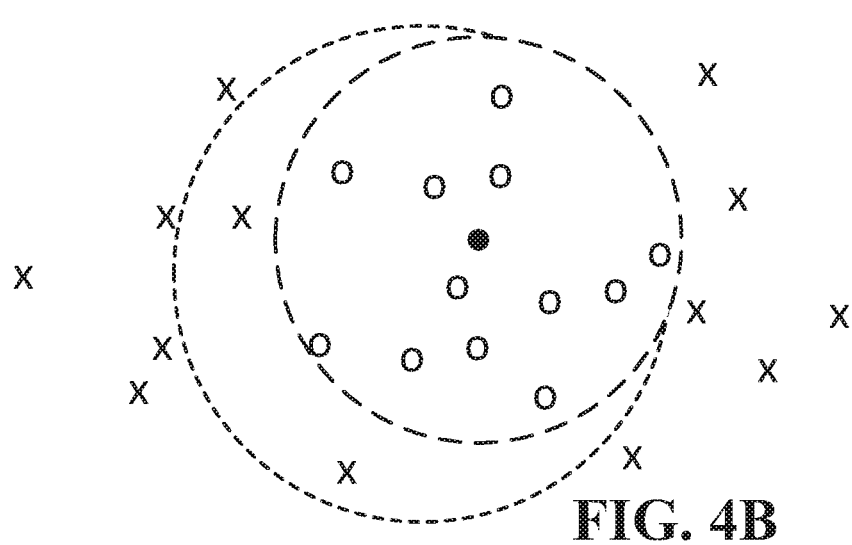
Figure 4C:
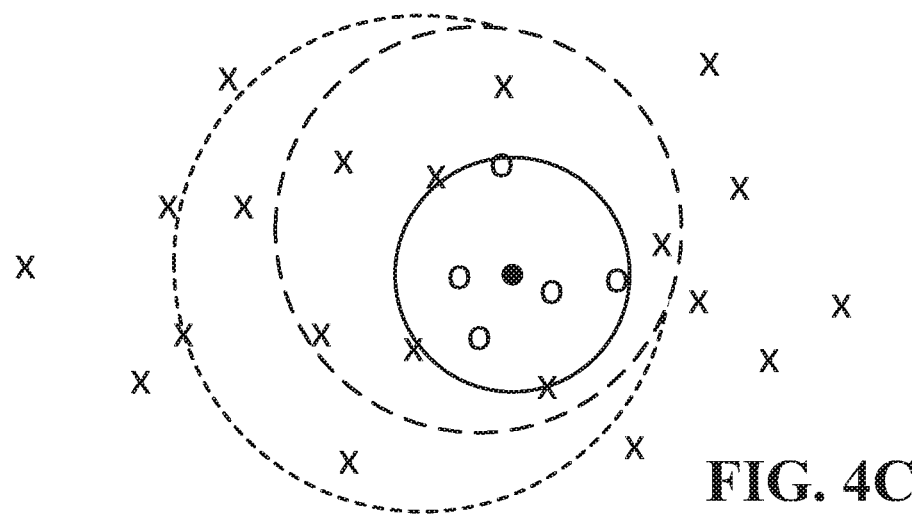

Block 335 represents a "Distance and Mean Clustering" technology. This is a process where the dataset is winnowed down and points are eliminated if they are outside a centroid point with a configurable (e.g., dynamically decreasing) margin. As represented in FIGS. 4A-4C, Distance and Mean Clustering is an iterative process that eliminates one or more candidates ("o" to "x") outside of a centroid with a defined error radius (e.g., FIG. 4A), and then re-runs, which changes the centroid. A smaller error radius can then be used (e.g., FIG. 4B), iteratively re-run and so forth, until there is a centroid with a defined final error radius (e.g., FIG. 4C). The remaining candidate location or locations, or the final centroid, can be used to determine the final estimated location.

It should be noted that FIGS. 4A-4C are only examples for purposes of illustration, and do not represent actual candidate locations, radii, centroids or the like. Indeed, although three such iterations are depicted, it is understood that any number of iterations can be performed. Moreover, the centroid of a circle is shown for simplicity in FIGS. 4A-4C a, however it is understood that other polygons or polyhedrons can be used with respect to the centroid and eliminating those not within the desired distance to the centroid in various implementations.

The results of these machine learning technologies, shown in conjunction with the "best" possible location result 550 (based on testing with known locations), and the typical results heretofore available the "Standard Result" 562 are shown in FIG. 5, where clf (for classifier) refers to the estimator instance.

Running the machine learning technologies using live data along with a process where the exact accuracy was determined, testing shows a typical accuracy of approximately 20 meters. This level of accuracy enables use cases that request this level of accuracy, and allows for probabilistic geo-fencing for points of interest over 40 meters. As can be seen in FIG. 5, each of the technologies 331-335 provided over fifty percent of timing based locates to be useful with a threshold of 30 meters, in contrast to the standard the percentages of locates at different accuracies which shows that that less than thirty percent of the locates returned are at the thirty meters accuracy (meaning that over seventy percent of locates are not useful for many location use cases with the standard results.

Considering that the "best" possible result with known actual locations is that approximately ninety percent of locates are within thirty meters, the most accurate technology with unknown actual location data is (at present) Distance and Mean Clustering, which provides approximately seventy-five percent of locates within that thirty meter threshold.

Figure 6:
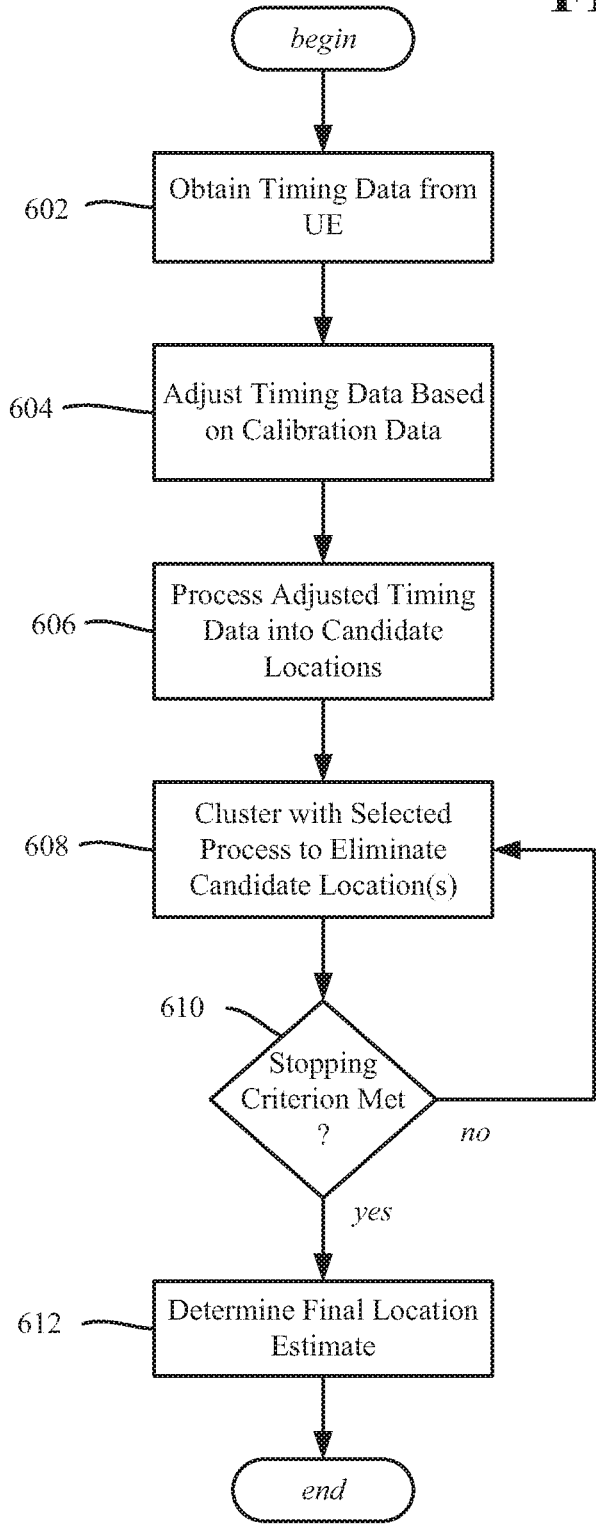
FIG. 6 is a flow diagram showing example operations for timing-based location estimation of a user equipment, in accordance with various aspects and implementations of the subject disclosure.

FIG. 6 is a flow diagram summarizing example operations, beginning at operation 602 where timing data is obtained from a user equipment. Operation 604 adjusts the timing data based on calibration data, e.g., for each pair of cells that are in use with respect to estimating the location of the user equipment.

Operation 606 represents processing the adjusted timing data into candidate locations, that is, the dataset to narrow into an estimated location. Operation 608 represents performing the clustering or the like with a selected process (a machine learning technology as in FIG. 3) to eliminate candidate location(s), Operation 610 represents determining whether the stopping criterion is met. For example, a number of remaining candidates can be the stopping criterion, a number of iterations can be the stopping criterion, a final radius relative to a centroid can be the stopping criterion, processing time can be the stopping criterion, and so on. More than one such criterion can be used (e.g., process until a certain reduced number of is reached or for a maximum number of iterations has been performed). If not met, the process returns to operation 608 to continue iterative re-running to eliminate candidates.

Operation 612 represents determining the final location estimate. Note that this can be a single value or can be more than one (e.g., the three most likely) depending on planned usage for the location information. Further, clustering at operation 608 may only reduce the number of candidates to some number, such as four; operation 612 can use this remaining number as it takes for a given application, e.g., average into a single location estimate.

Figure 7:
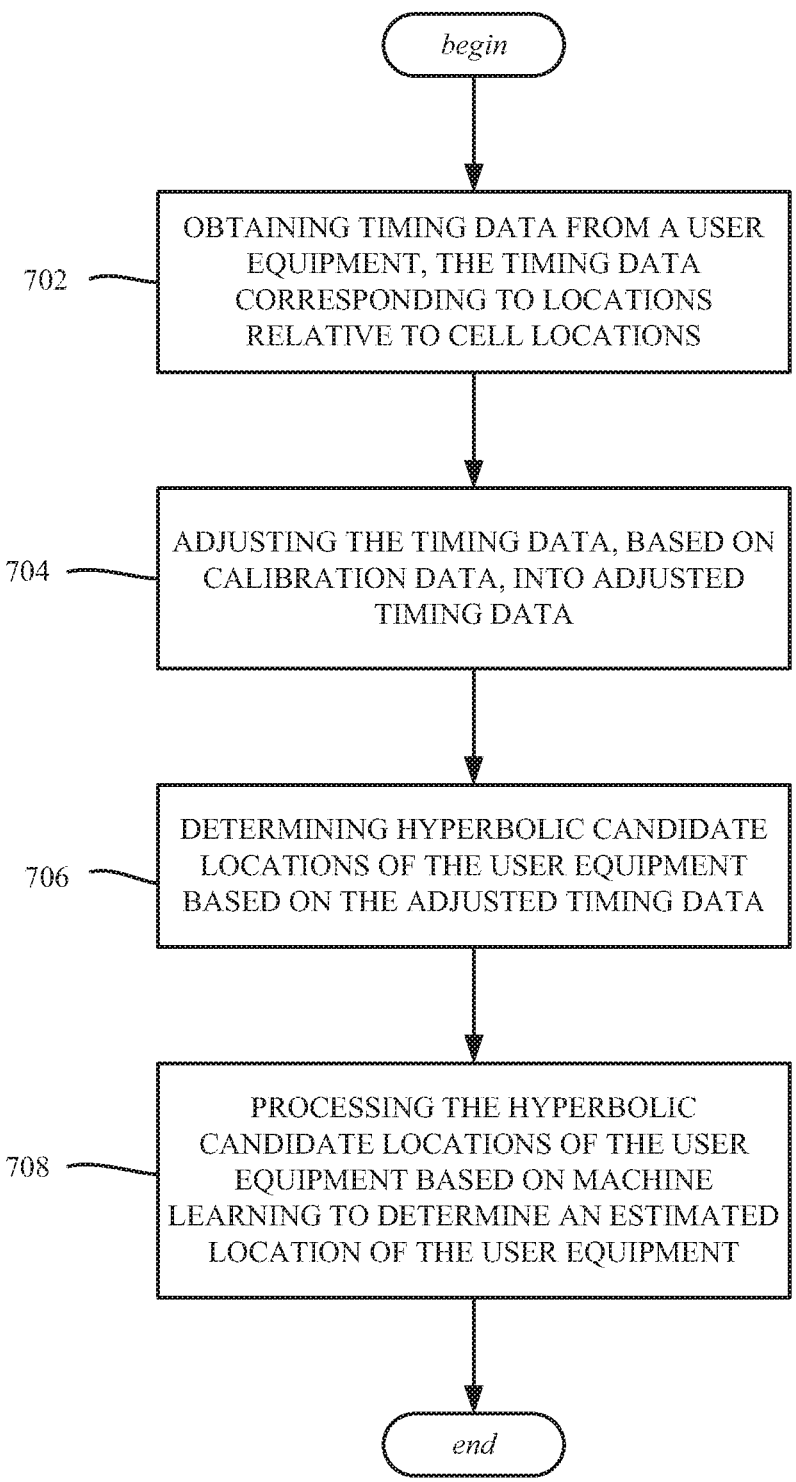
FIG. 7 is a flow diagram showing example operations for machine learning-based location estimation of a user equipment based on timing data, in accordance with various aspects and implementations of the subject disclosure.

FIG. 7 summarizes various example operations, such as of a first transmit and receive point device of a wireless network, e.g., comprising a processor and a memory that stores executable instructions that, when executed by the processor, facilitate performance of operations. Operation 702 represents obtaining timing data from a user equipment, the timing data corresponding to locations relative to cell locations. Operation 704 represents adjusting the timing data, based on calibration data, into adjusted timing data. Operation 706 represents determining hyperbolic candidate locations of the user equipment based on the adjusted timing data. Operation 708 represents processing the hyperbolic candidate locations of the user equipment based on machine learning to determine an estimated location of the user equipment.

Processing the hyperbolic candidate locations of the user equipment based on the machine learning can comprise determining relative weights of the hyperbolic candidate locations, clustering the hyperbolic candidate locations based on the relative weights, and iteratively eliminating at least one of the hyperbolic candidate locations until a most likely location of the user equipment is determined.

Processing the hyperbolic candidate locations of the user equipment based on the machine learning can comprise performing Gaussian mixture modeling on the hyperbolic candidate locations. Processing the hyperbolic candidate locations of the user equipment based on the machine learning can comprise performing k-means clustering on the hyperbolic candidate locations with outlier detection. Processing the hyperbolic candidate locations of the user equipment based on the machine learning comprises performing k-means clustering on the hyperbolic candidate locations with leave-four outlier detection.

Processing the hyperbolic candidate locations of the user equipment based on the machine learning can comprise performing k-means distance-based clustering on the hyperbolic candidate locations. The k value can equal three.

Processing the hyperbolic candidate locations of the user equipment based on the machine learning can comprise performing first k-means clustering with multiple cluster sizes to eliminate a percentage of the hyperbolic candidate locations farthest away from the clusters, and performing second k-means clustering on remaining hyperbolic candidate locations.

Processing the hyperbolic candidate locations of the user equipment based on the machine learning can comprise performing first k-means clustering with multiple cluster sizes to eliminate a percentage of the hyperbolic candidate locations farthest away from the clusters, and performing second k-means clustering, wherein k equals three in the second k-means clustering, on remaining hyperbolic candidate locations that have not yet been eliminated.

Processing the hyperbolic candidate locations of the user equipment based on the machine learning can comprise iteratively performing distance and mean clustering to eliminate at least one of the hyperbolic candidate locations, per iteration, that are outside a centroid point with a configurable margin to determine a centroid with a defined error radius as a most likely location of the user equipment.

Figure 8:
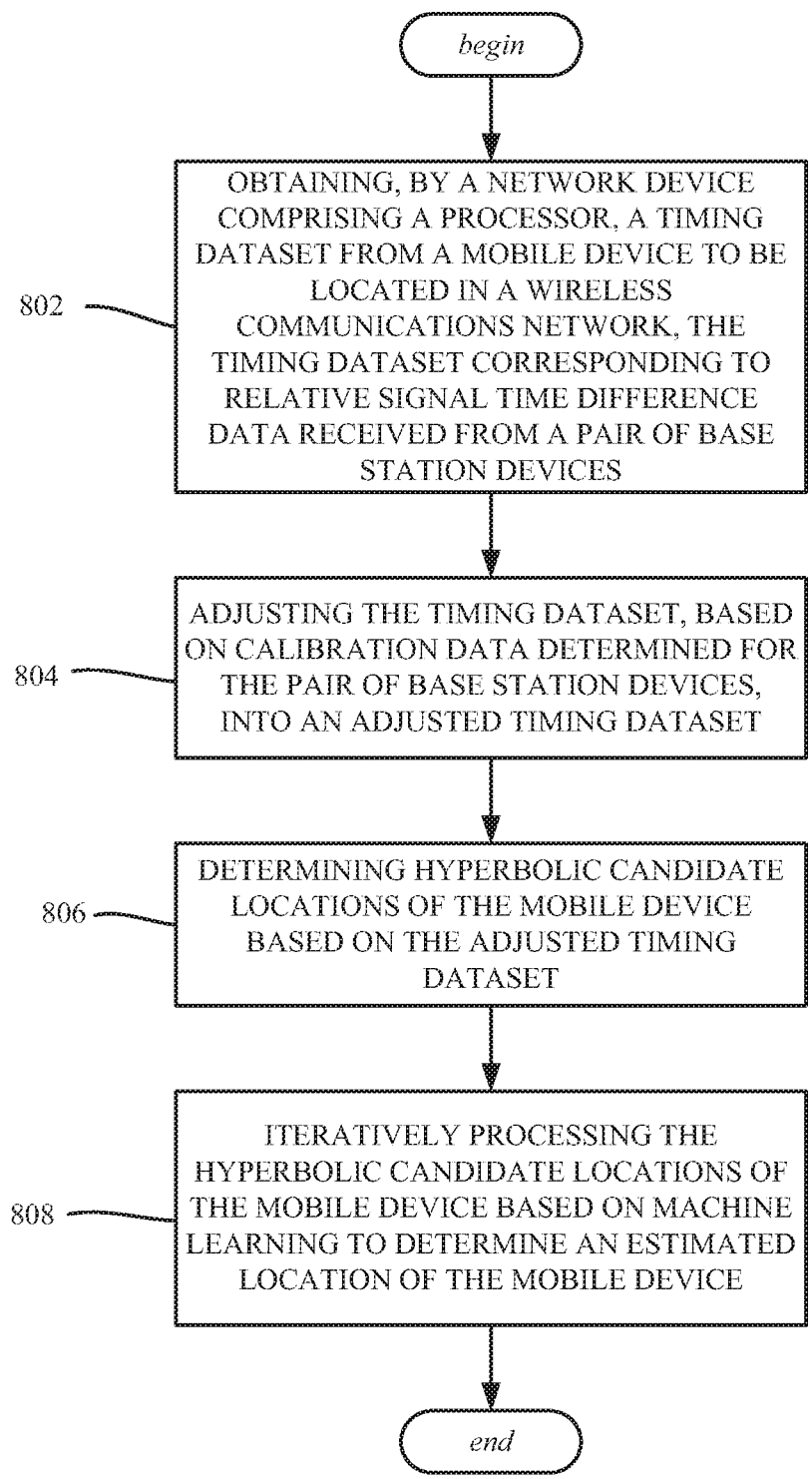
FIG. 8 is a flow diagram showing example operations for timing-based location estimation of a user equipment, including by iterative processing, in accordance with various aspects and implementations of the subject disclosure.

FIG. 8 summarizes various example operations, such as of a method performed via a network device comprising a processor. Operation 802 represents obtaining, by a network device comprising a processor, a timing dataset from a mobile device to be located in a wireless communications network, the timing dataset corresponding to relative signal time difference data received from a pair of base station devices. Operation 804 represents adjusting the timing dataset, based on calibration data determined for the pair of base station devices, into an adjusted timing dataset. Operation 806 represents determining hyperbolic candidate locations of the mobile device based on the adjusted timing dataset. Operation 808 represents iteratively processing the hyperbolic candidate locations of the mobile device based on machine learning to determine an estimated location of the mobile device.

Iteratively processing the hyperbolic candidate locations of the mobile device based on the machine learning can comprise iteratively performing Gaussian mixture modeling on the hyperbolic candidate locations.

Iteratively processing the hyperbolic candidate locations of the mobile device based on the machine learning can comprise, over multiple iterations, determining a location value representative of the hyperbolic candidate locations and removing an outlier hyperbolic candidate location based on distance to the value and iterating until a reduced number of remaining hyperbolic candidate locations is reached, and using the remaining hyperbolic candidate locations to determine the estimated location of the mobile device.

Iteratively processing the hyperbolic candidate locations of the mobile device based on the machine learning can comprise performing k-means clustering on the hyperbolic candidate locations.

Iteratively processing the hyperbolic candidate locations of the user equipment based on the machine learning can comprise performing first k-means clustering with multiple cluster sizes to eliminate a percentage of the hyperbolic candidate locations furthest away from the clusters, and performing second k-means clustering on remaining hyperbolic candidate locations.

Iteratively processing the hyperbolic candidate locations of the mobile device based on the machine learning can comprise iteratively performing distance and mean clustering to eliminate hyperbolic candidate locations, per iteration, that are outside a centroid point with a dynamic margin to determine a centroid with a defined error radius as a most likely location of the mobile device.

Figure 9:
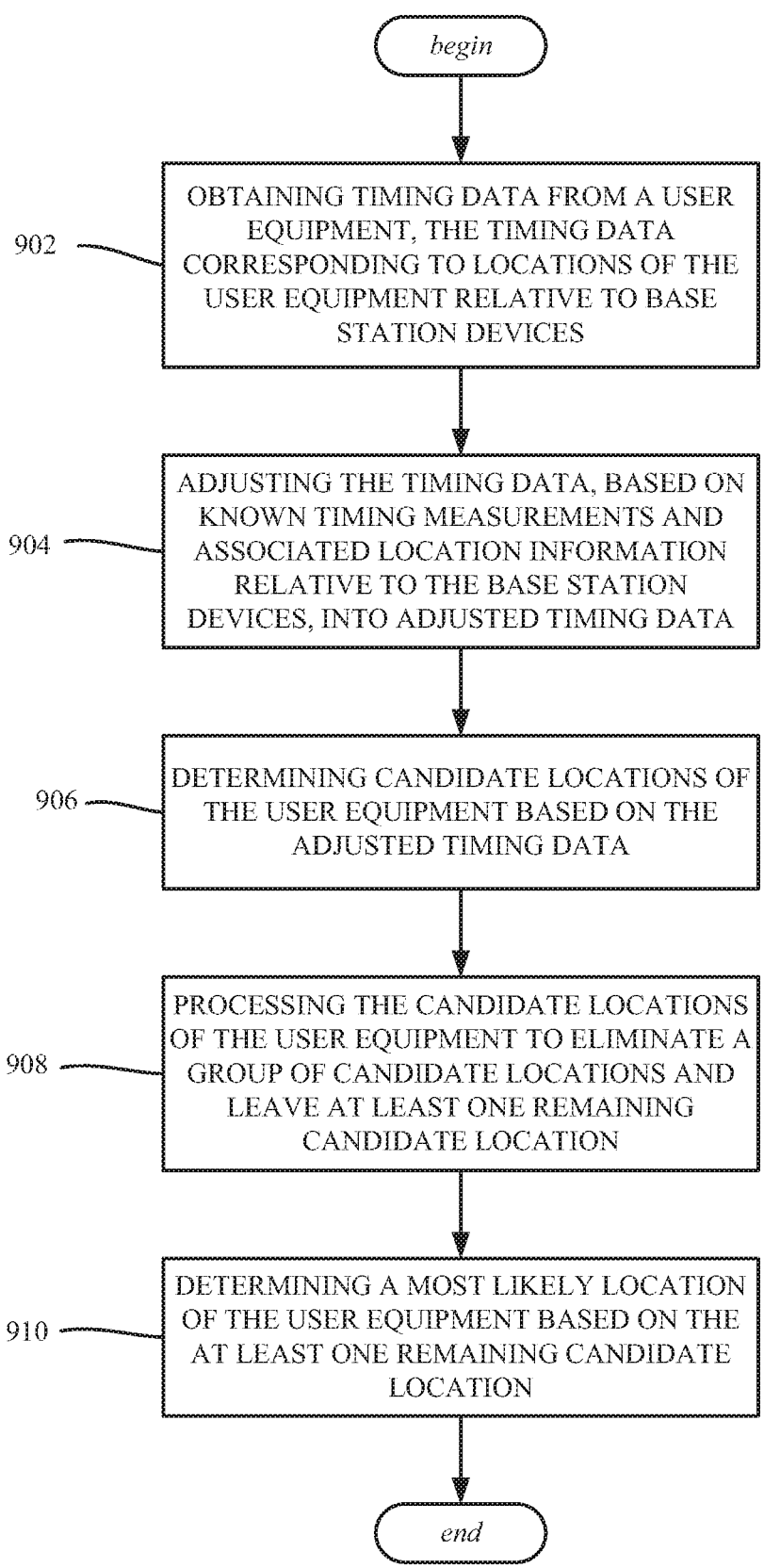
FIG. 9 is a flow diagram showing example operations for timing-based location estimation of a user equipment, including by eliminating candidate locations, in accordance with various aspects and implementations of the subject disclosure, in accordance with various aspects and implementations of the subject disclosure.

FIG. 9 summarizes various example operations, such as of a network device of a wireless communications system, e.g., comprising a processor and a memory that stores executable instructions that, when executed by the processor, facilitate performance of operations. Operation 902 represents obtaining timing data from a user equipment, the timing data corresponding to locations of the user equipment relative to base station devices. Operation 904 represents adjusting the timing data, based on known timing measurements and associated location information relative to the base station devices, into adjusted timing data. Operation 906 represents determining candidate locations of the user equipment based on the adjusted timing data. Operation 908 represents processing the candidate locations of the user equipment to eliminate a group of candidate locations and leave at least one remaining candidate location. Operation 910 represents determining a most likely location of the user equipment based on the at least one remaining candidate location.

Processing the candidate locations of the user equipment can comprise performing k-means clustering on the hyperbolic candidate locations with outlier detection, and wherein k equals three.

Processing the candidate locations of the user equipment can comprise performing k-means clustering with outlier detection on the candidate locations.

Processing the candidate locations of the user equipment can comprise iteratively performing distance and mean clustering to eliminate the group of candidate locations.

As can be seen, the technology described herein facilitates accurate location of a user equipment. Conventional timing-based location methods (typically in the fifty-to-eighty meter range on average) such as OTDOA do not provide sufficient accuracy and reliability to support a number of location use cases. For example, location methods to place small cells implicate location accuracies in the twenty to forty meter range. Therefore, technology described herein provides benefits and advantages for many use cases, including for non-smart devices, in indoor scenarios, and in urban canyon scenarios.

Figure 10:
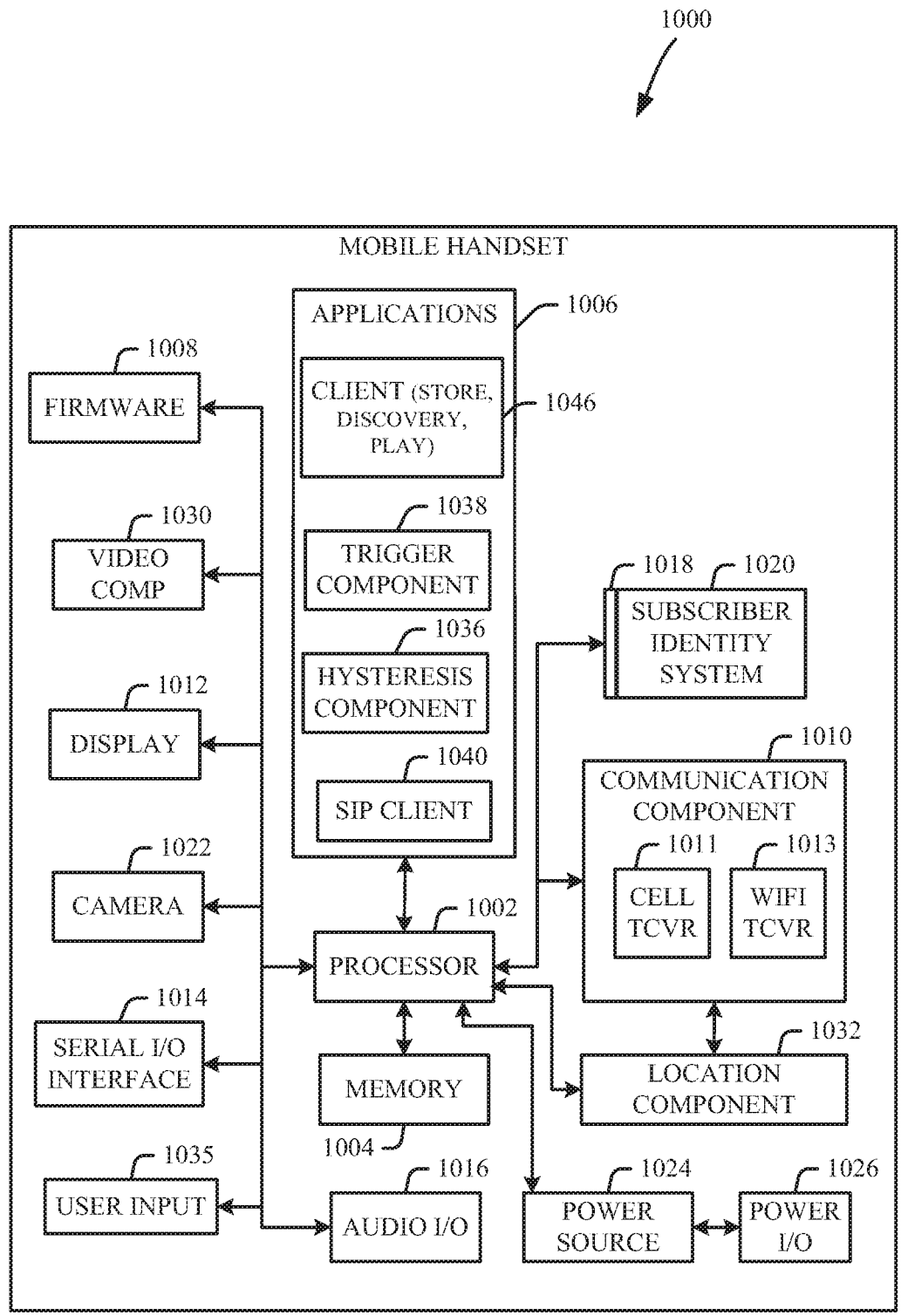
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000.

As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
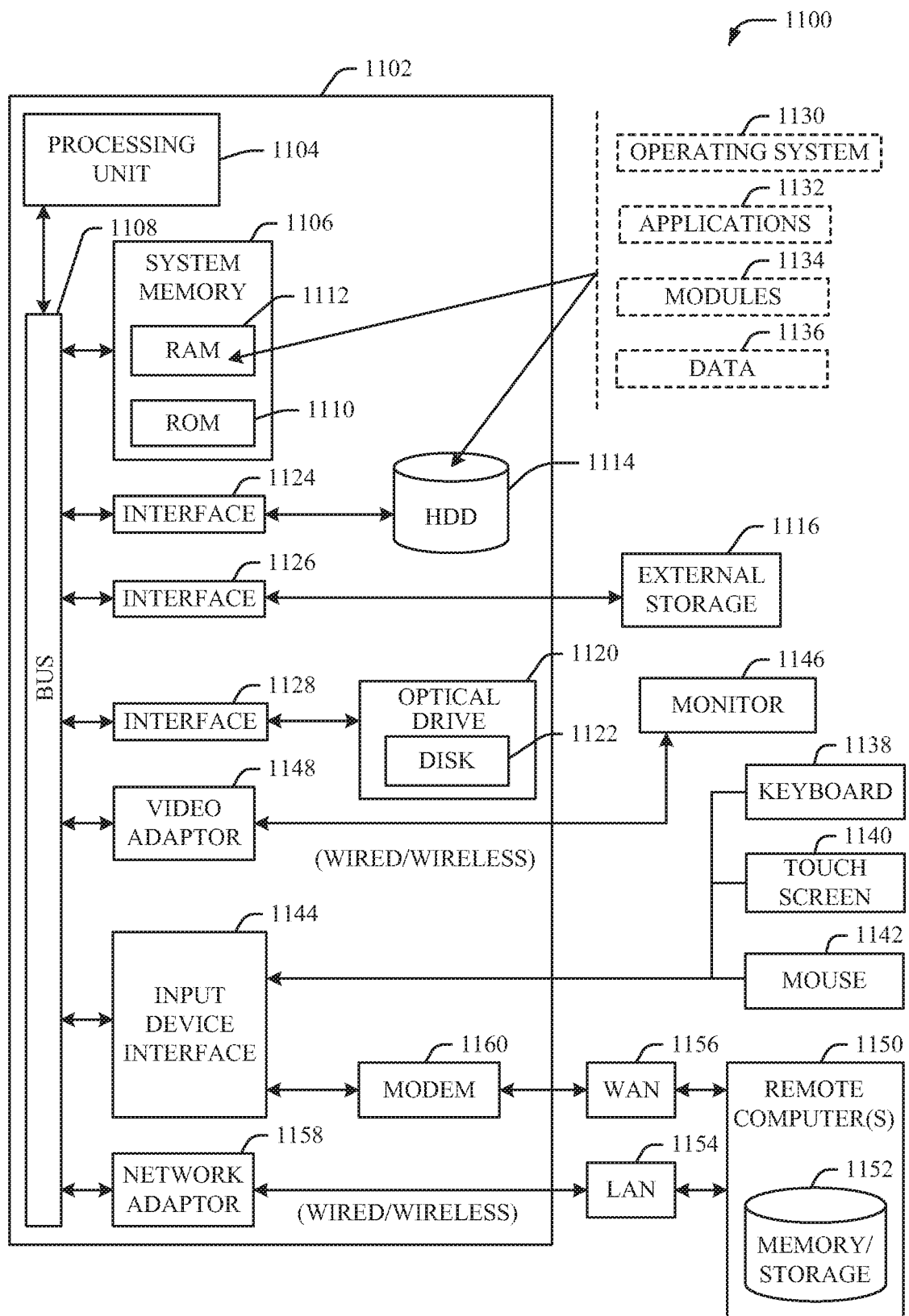
FIG. 11 illustrates an example block diagram of an example computer/machine device operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network equipment, comprising:
    a processor; and
    a memory that stores executable instructions that, when executed by the processor, facilitate performance of operations, the operations comprising:
        obtaining timing data from a user equipment, the timing data corresponding to locations relative to cell locations;
        adjusting the timing data, based on calibration data, into adjusted timing data;
        determining hyperbolic candidate locations of the user equipment based on the adjusted timing data; and
        processing the hyperbolic candidate locations of the user equipment based on machine learning to determine an estimated location of the user equipment, wherein processing the hyperbolic candidate locations of the user equipment based on the machine learning comprises, iteratively performing until a stopping criterion is satisfied:
            clustering the hyperbolic candidate locations based on a clustering criterion, and
            eliminating at least one of the hyperbolic candidate locations from being the estimated location of the user equipment.

2. The network equipment of claim 1, wherein the clustering criterion comprises evaluation of relative weights of the hyperbolic candidate locations.

3. The network equipment of claim 1, wherein the stopping criterion comprises evaluation of an amount of processing time.

4. The network equipment of claim 1, wherein the stopping criterion comprises evaluation of a defined error radius relative to a centroid.

5. The network equipment of claim 1, wherein the stopping criterion comprises evaluation of a number of iterations.

6. The network equipment of claim 1, wherein the stopping criterion comprises evaluation of a threshold quantity of remaining hyperbolic candidate locations of the hyperbolic candidate locations.

7. The network equipment of claim 6, wherein the operations further comprises determining the threshold quantity of remaining hyperbolic candidate locations to employ as the stopping criterion based on an application that is to use the estimated location of the user equipment.

8. The system of network equipment 1, wherein processing the hyperbolic candidate locations of the user equipment based on the machine learning comprises performing first k-means clustering with multiple cluster sizes to eliminate a percentage of the hyperbolic candidate locations farthest away from the clusters, and performing second k-means clustering on remaining hyperbolic candidate locations.

9. The network equipment of claim 1, wherein processing the hyperbolic candidate locations of the user equipment based on the machine learning comprises performing first k-means clustering with multiple cluster sizes to eliminate a percentage of the hyperbolic candidate locations farthest away from the clusters, and performing second k-means clustering, wherein k equals three in the second k-means clustering, on remaining hyperbolic candidate locations that have not yet been eliminated.

10. The network equipment of claim 1, wherein processing the hyperbolic candidate locations of the user equipment based on the machine learning comprises iteratively performing distance and mean clustering to eliminate at least one of the hyperbolic candidate locations, per iteration, that are outside a centroid point with a configurable margin to determine a centroid with a defined error radius as a most likely location of the user equipment.

11. A method, comprising:
    obtaining, by network equipment comprising a processor, a timing dataset from a user equipment to be located in a communications network, the timing dataset corresponding to relative signal time difference data received from a pair of base stations;
    adjusting, by the network equipment, the timing dataset, based on calibration data determined for the pair of base stations, into an adjusted timing dataset;
    determining, by the network equipment, hyperbolic candidate locations of the user equipment based on the adjusted timing dataset; and
    iteratively processing, by the network equipment until a stopping criterion is fulfilled, the hyperbolic candidate locations of the user equipment based on machine learning to determine an estimated location of the user equipment, wherein the iteratively processing the hyperbolic candidate locations of the user equipment based on the machine learning comprises:
        clustering the hyperbolic candidate locations based on a clustering criterion, and removing at least one of the hyperbolic candidate locations from consideration as the estimated location of the user equipment.

12. The method of claim 11, wherein the stopping criterion comprises a criterion with respect to an amount of processing time.

13. The method of claim 11, wherein the stopping criterion comprises a criterion with respect to a defined error radius relative to a centroid.

14. The method of claim 11, wherein the stopping criterion comprises a criterion with respect to a number of iterations.

15. The method of claim 11, wherein the stopping criterion comprises a criterion with respect to a threshold quantity of remaining hyperbolic candidate locations of the hyperbolic candidate locations.

16. The method of claim 11, further comprising determining, by the network equipment, the threshold quantity of remaining hyperbolic candidate locations to employ as the stopping criterion based on a planned usage of the estimated location of the user equipment.

17. A non-transitory machine-readable storage medium, comprising executable instructions that, when executed by a processor of network equipment, facilitate performance of operations, the operations comprising:
 obtaining timing data from a user equipment, the timing data corresponding to locations of the user equipment relative to base station devices;
 adjusting the timing data, based on known timing measurements and associated location information relative to the base station devices, into adjusted timing data;
 determining candidate locations of the user equipment based on the adjusted timing data;
 processing the candidate locations of the user equipment to eliminate a group of candidate locations and leave at least one remaining candidate location, wherein processing the candidate locations of the user equipment comprises, iteratively executing until a stopping criterion is fulfilled:
  clustering the candidate locations based on a clustering criterion, and
  eliminating at least one of the candidate locations from consideration as a location of the user equipment; and
 determining a most likely location of the user equipment based on the at least one remaining candidate location.

18. The non-transitory machine-readable storage medium of claim 17, wherein the stopping criterion comprises an amount of processing time.

19. The non-transitory machine-readable storage medium of claim 17, wherein the stopping criterion comprises a threshold quantity of remaining candidate locations of the candidate locations.

20. The non-transitory machine-readable storage medium of claim 17, wherein the operations further comprises determining the threshold quantity of remaining hyperbolic candidate locations to employ as the stopping criterion based on an application that will use the estimated location of the user equipment.

* * * * *